No. 668,693. Patented Feb. 26, 1901.
G. E. SPURR.
VEHICLE NUT WRENCH.
(Application filed Oct. 3, 1900.)

(No Model.)

Witnesses.
Marion Richards.
Annie M. Cole.

Inventor.
George E. Spurr
by
Verrill & Clifford
Attorneys.

UNITED STATES PATENT OFFICE.

GEORGE E. SPURR, OF PORTLAND, MAINE.

VEHICLE-NUT WRENCH.

SPECIFICATION forming part of Letters Patent No. 668,693, dated February 26, 1901.

Application filed October 3, 1900. Serial No. 31,865. (No model.)

*To all whom it may concern:*

Be it known that I, GEORGE E. SPURR, a citizen of the United States, residing at Portland, in the county of Cumberland and State of Maine, have invented certain new and useful Improvements in Vehicle-Nut Wrenches; and I do hereby declare the following to be a full, clear, and exact description of the invention, such as will enable others skilled in the art to which it appertains to make and use the same.

My invention relates to improvements in vehicle-nut wrenches, and relates especially to that class of wrenches which may be inserted in the hub of the wheel and affixed to the axle-nut, so that when the wheel is given a turn in either one direction or the other the nut holding the same on the axle may be loosened or tightened, as desired.

It further consists of means for adjusting the same, so that it may be inserted in hubs of different interior diameters.

Figure 1:
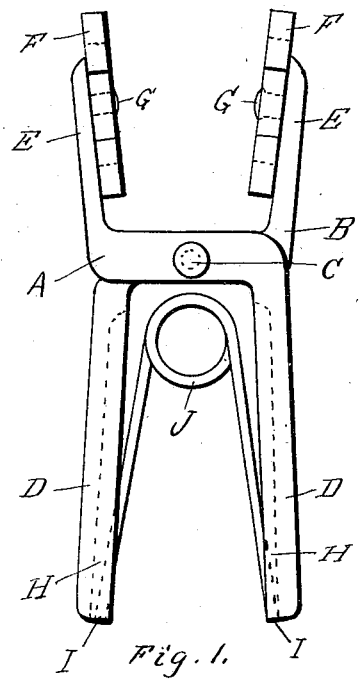
Figure 2:
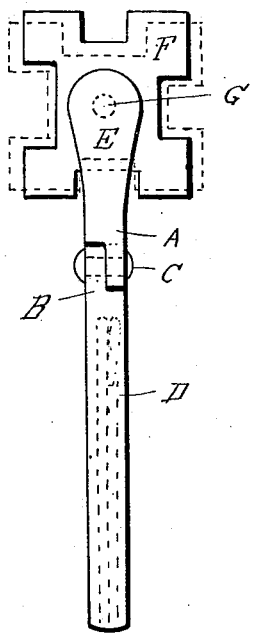

In the drawings herewith accompanying and forming a part of this application, Figure 1 is a side elevation of my improved wrench. Fig. 2 is an end elevation of the same, the dotted lines showing a different position of the gripping-plates when the same have been turned upon their pivots, so as to adapt them to hubs of different interior diameters.

My improved device consists of two members A and B, substantially in the form of a bell-crank, pivotally joined at C, the lower ends of said members forming handles D, the upper ends forming clamping-jaws E. Pivotally mounted on the clamping-jaws E are gripping-plates F, substantially parallelogrammatic in outline. The object in making these plates of this form—that is, with sides of different lengths—is to enable the wrench to be inserted in hubs of different interior diameters. When the said plates are turned upon their pivots G, the longer or shorter side is brought uppermost, so that the altitude of the plate will correspond to the interior diameter of the wheel-hub and make a comparatively tight fit, so that when the wheel is revolved the wrench will revolve with it. The handles D are provided with grooves H, having a seat I in the lower end. Adapted to be inserted between the handles and in such a manner that it may rest in the grooves H is a spring J, the natural tendency of which is to keep the handles apart and at the same time force the clamping-jaws and plates against the inner sides of the wheel-hub, so as to cause the wrench to turn with the wheel when so desired.

The operation of my improved device is as follows: The grip-plates are adjusted on their pivots, so that they may be inserted within the hub of the wheel and so that the outer edges of the plates will bear against the inner side of the hub and bind. The jaws are thus so placed as to straddle the nut. The wheel is then set in motion, and from the fact that the edges of the plates bear against the inside of the hub of the wheel the nut is unscrewed. To place the nut back upon the axle, the process is simply reversed, the wrench remaining in the hub of the wheel and keeping the nut in position when the wheel is removed from the axle. In replacing the nut the danger of twisting the end of the axle by setting the nut up too tightly is overcome from the fact that the edges of the gripping-plates bearing against the inner side of the hub do not bind with sufficient force to allow the nut to be set up tighter than is required for holding the wheel in place. After the nut has been set up to the required place the hub will revolve on the wrench without setting the nut any tighter.

Having thus described my invention and its use, I claim—

1. In a vehicle-nut wrench in combination, pivoted members having handles at one end and clamping-jaws at the other, said clamping-jaws having parallelogrammatic gripping-plates pivotally attached thereto, substantially as and for the purposes set forth.

2. In a vehicle-nut wrench, in combination, pivoted members having handles on one extremity, clamping-jaws on their outer ends, parallelogrammatic gripping-plates pivotally mounted on said clamping-jaws and means for normally keeping said jaws apart, substantially as and for the purposes set forth.

3. In a vehicle-nut wrench, in combination, bell-crank-shaped members pivoted together, one end of said members serving as clamping-jaws, said jaws having parallelogrammatic gripping-plates pivotally mounted thereon, the other end of said members serving as a handle, grooves in the inner sides of said handle and a spring seated in said grooves to keep said handle and jaws normally apart, substantially as and for the purposes set forth.

In testimony whereof I affix my signature, in presence of two witnesses, this 29th day of September, 1900.

GEORGE E. SPURR.

Witnesses:
NATHAN CLIFFORD,
MARION RICHARDS.